Oct. 8, 1968  R. R. BALAGUER  3,405,012
METHOD OF FORMING A BATTERY CUP
Filed May 24, 1966
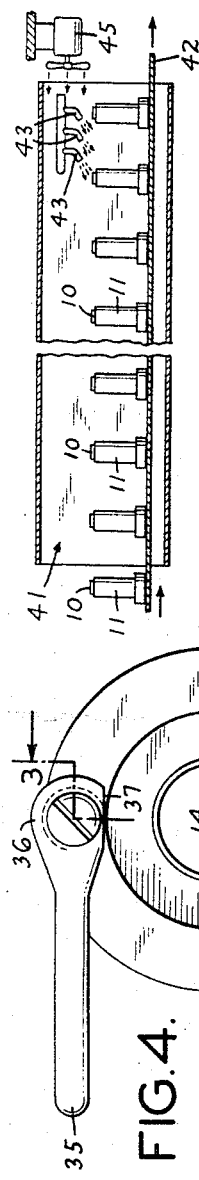
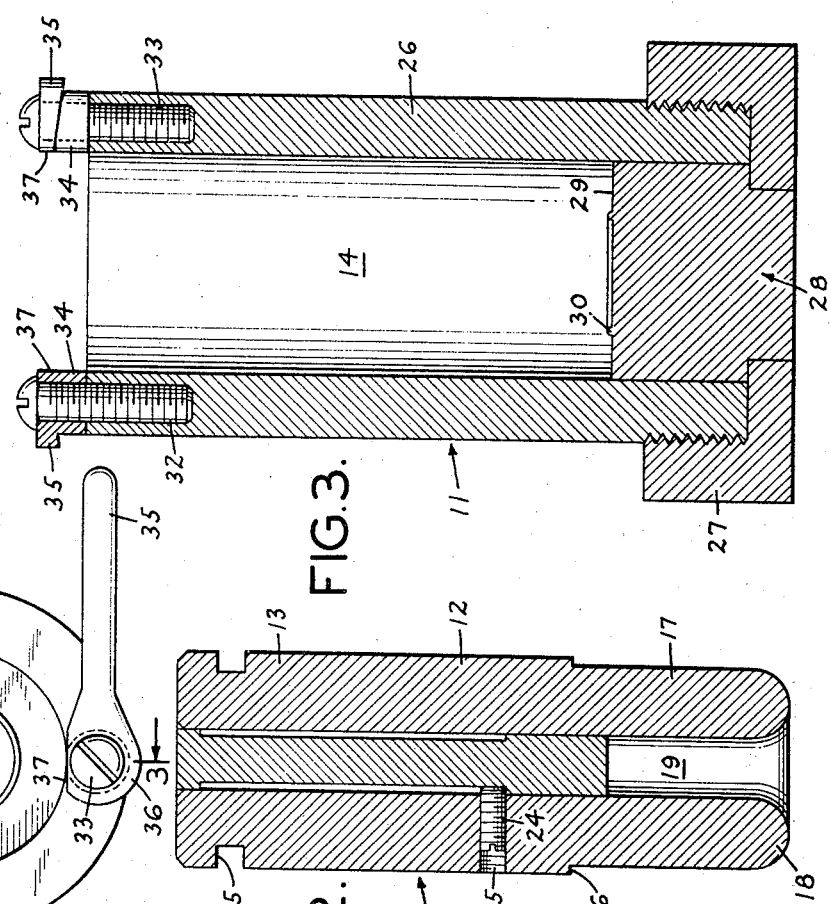
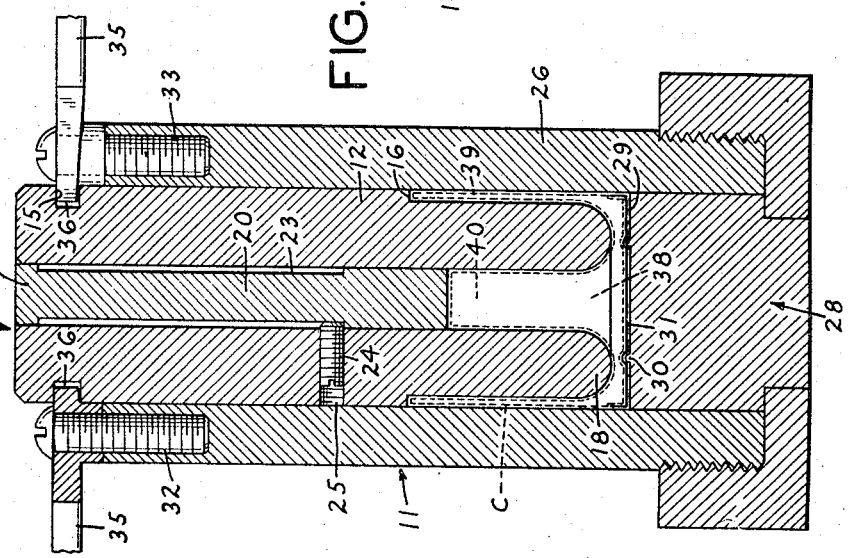

United States Patent Office 3,405,012
Patented Oct. 8, 1968

3,405,012
METHOD OF FORMING A BATTERY CUP
Rodolfo Rodriguez Balaguer, Fort Lauderdale, Fla., assignor to Battery Corporation of America, Fort Lauderdale, Fla., a corporation of Florida
Filed May 24, 1966, Ser. No. 552,452
18 Claims. (Cl. 136—122)

ABSTRACT OF THE DISCLOSURE

A method of molding a thin walled, self-supporting, electrically conductive green carbon cup in which a mixture is formed of from 20–40% by weight of a thermosetting resin and the balance an electrically conductive carbonaceous material. The mixture is charged into a mold and is contacted with a heated piston to cure the binder. An axial external force is immediately applied to the piston to mold the mixture. After a partial cure of the binder has been effected, the pressure is reduced to a small fraction of its initial value and is held at tht level until a substantially complete cure of the binder is obtained. The piston and mold are then cooled and separated.

The present invention relates to dry cell batteries of the so-called inside-out type and more particularly to a carbon cup for use in such batteries and to a method for forming such cups.

In United States Patent 2,903,499 issued Sept. 8, 1959, to R. R. Balaguer there is described and claimed a dry cell battery construction of the inside-out type in which there is provided a self-supporting carbon cup which serves as the cathode or positive electrode and also as the container for the battery mix and metallic anode. The construction of the dry cell battery of that patent has been found particularly suitable for magnesium cells, for example, of the type described and claimed in United States Patent 3,214,299 issued Oct. 26, 1965, to R. R. Balaguer.

The green carbon battery cathode cups of the patents referred to above have generally been made from a mixture of a carbonaceous binder and an electrically conductive carbonaceous material, notably coal tar pitch and graphite or calcined petroleum coke. And such cups have proven satisfactory for most purposes. However, for certain types of cells, and particularly where cells are to be stored at elevated temperatures, problems have arisen with these cups which result in occasional cells exhibiting poor shelf life. These problems are particularly evident with magnesium cells.

One problem which has been noted is for cracks in the carbon wall to form in or near the cup bottom, i.e., at the closed end of the cathode cup. Such cracks, while generally very small, permit a seepage of electrolyte which contacts the battery metal positive terminal and corrodes the latter. Such contact sets up a parasitic cell (metal-electrolyte-carbon) the action of which may greatly reduce cell shelf life. In some cases the porosity of the carbon cup or a portion thereof may increase due to swelling and permit electrolyte seepage even without actual cracks.

These problem are encountered only very rarely when the cells are stored at or near ordinary room temperature, but the incidence of faulty cells becomes much higher when the cells are stored at elevated temperatures. Thus, when the cells are stored at temperatures above 130° F. the problems of cell leakage have been found to be quite serious.

Cell leakage through carbon swelling cup cracks apparently occurs primarily because of softening of the pitch binder and consequent deformation of the cup structure.

The principal object of the present invention has been the provision of a novel and improved carbon cup which minimizes the foregoing and other disadvantages.

Another object of the invention has been the provision of a green carbon cup which is well adapted for use in cells intended for storage at elevated temperatures.

Still another object of the invention has been the provision of a green carbon cup which minimizes leakage problems in magnesium cells.

A further object of the invention has been the provision of a green carbon cup which is stronger than those previously available and which is more resistant to damage from impact and high temperatures.

Yet another object of the invention has been the provision of a green carbon cup which can be baked, i.e., carbonized, without appreciable distortion or cracking.

Another object of the invention has been the provision of a novel and improved process for making the green carbon cup of the invention.

Yet another object of the invention has been the provision of such a process which is well adapted to efficient, low-cost production techniques.

Other and further objects, features and advantages of the invention will appear more fully from the following description of the invention taken in connection with the appended drawing, in which:

FIG. 1 is a longitudinal sectional view of an assembled mold and piston for carrying out the method of the invention;

FIG. 2 is a longitudinal sectional view of the piston of FIG. 1;

FIG. 3 is a longitudinal sectional view of the mold of FIG. 1 and is taken along the line 3—3 of FIG. 4;

FIG. 4 is a top plan view of the mold of FIG. 3; and

FIG. 5 is a diagrammatic longitudinal sectional view illustrating an apparatus for performing the cooling step of the invention.

The green carbon cup of the invention is prepared from a mixture of an electrically conductive carbonaceous material, e.g., natural graphite, electric furnace graphite or calcined petroleum coke, and a thermosetting plastic binder which can be cured in a relatively short time and at a relatively low temperature, e.g., a phenol formaldehyde resin molding powder such as Bakelite. Other thermosetting plastics can be used.

The thermosetting binder proportion of the mixture should be more than 20% and less than 40%, by weight. If the thermosetting binder proportion is too low the powdered mix will not flow properly when subjected to molding pressure. If the thermosetting binder proportion is too high the cup conductivity will be too low.

A particularly useful mix has been found to be about 25% Bakelite (of the grade designated by Union Carbide Corporation as BRP5417) and 75% electric furnace graphite or calcined petroleum coke. A "fat"-D size magnesium cell made with a cup formed from this mix by the process of the invention was found to have a short circuit current of 11 amperes. A similar cell differing only in mix proportions—35% Bakelite and 65% electric furnace graphite—was found to have a short circuit current of 1.5 amperes.

The components of the mix may be combined before or after comminution. The final mix should be a fine powder, e.g., of a fineness such that about 80% will pass a 200 mesh screen. Comminution may be effected in any suitable mill, grinder or other device.

Efforts have been made to mold the mix of the invention by the electrical molding process described in the aforementioned Balaguer patents. However, it has been found that where the thermosetting plastic binder content is as high as 20% the cups tend to stick to the molding plunger resulting in an intolerably high reject rate.

A suitable molding apparatus for carrying out the process of the invention is illustrated in the drawing. This apparatus comprises a piston 10, shown separately in FIG. 2, and a mold 11, shown separately in FIGS. 3 and 4. The piston and mold are shown assembled in FIG. 1 with a battery cup C shown in dotted lines.

The piston 10 comprises an annular body 12 having an upper portion 13 whose diameter (when heated) permits it to slide into and out of mold cavity 14. For making a so-called "fat-D" size cell having a diameter slightly in excess of 1½" and a height of about 1¾", the outside diameter of upper portion 13 might be 1.590" while the internal diameter of mold cavity 14 might be 1.598". It should be understood that the foregoing and other dimensions set forth herein are given only by way of example.

A circumferential groove 15 is provided in the outer surface of piston 10 adjacent the top end thereof. Groove 15 might conveniently be 3/16" high and 1/8" deep. Upper portion 13, which might have an axial length of 2.945", terminates at a sharp radially extending annular shoulder 16, the radial extent of which should equal approximately the wall thickness of the cup to be molded, e.g., 0.0435".

A lower portion 17 of annular body 12 extends from shoulder 16 down to a rounded end 18. The lower portion 17 is preferably tapered slightly. Thus at shoulder 16 lower portion 17 might have a diameter of 1.503", while just above rounded end 18 the diameter might be 1.497". The axial length or height of lower portion 17 is determined by the desired cup wall height and might be 1.610".

The upper end of central space 19 of piston 10 is closed by a slidable ejector pin 20 having a head 21, a base 22 and an intermediate reduced diameter portion 23. The diameter of central space 19 should be equal to the desired cup center rod diameter, e.g., 3/8".

Upward travel of pin 20 is limited by a screw 24 acting in a threaded hole 25 in the wall of piston 10. The screw 24 extends into the annular space around reduced diameter portion 23 and is arranged to contact base 22. The ejector pin length is selected to provide an empty space below base 23 with a length equal to the cup central rod length, e.g., 1¼".

Mold 11 comprises an annular body 26 threaded at its lower end to receive a threaded base member 27. Base member 27 has a central hole adapted to receive a removable anvil 28 the upper surface 29 of which completely closes the mold cavity. An annular ridge 30 in surface 29 is adapted to enter a corresponding groove in a metal end cap which may be inserted in them old cavity prior to charging of the cavity with the molding powder. An end cap 31 is shown in FIG. 1.

The upper end of body 26 is provided with threaded holes spaced 180° apart and adapted to receive screws 32 and 33, respectively. Screws 32 and 33 each extend through a hole in a hub portion 34 of a respective one of locking arms 35. Hub 34 has a rounded peripheral portion 36 and a flat portion 37.

Each of the locking arms 35 is adapted to be pivoted around its screw 32 or 33 from the positions shown in FIG. 4 to the positions shown in FIG. 1. In the FIG. 4 positions of the locking arms 35 the flat portions 37 are aligned with and tangent to mold cavity 14 to permit insertion and withdrawal of piston 10 from the mold cavity. By rotating the locking arms 90° to the FIG. 1 positions thereof, the rounded portions 36 are caused to enter groove 15 in the upper end of piston 10 and serve releasably to lock the piston in the mold cavity for a purpose to be described below.

The carbon cup C shown dotted in FIG. 1 is formed between the piston 10 and mold 11. Cup C has a base 38, an annular side wall 39 and a central rod 40.

The piston 10 and mold 11 may be made of any suitable materials which will not contaminate the cup surface with metal particles. For example, both the piston and mold may be made of hardened tool steel. The mold may, if desired, be provided with a ceramic liner, e.g., aluminum oxide.

The first step in making the carbon cup of the invention is formation of the mix, as described above. The battery metal end cap 31, if one is to be provided, is then inserted in cavity 14 and rests on surface 29 of anvil 28. The desired quantity of molding powder mix is then inserted in the mold cavity 14 as by pouring. The mix constituents should be thoroughly intermixed to provide a homogeneous mix. The mold may be at room temperature (70–80° F.) when the mix is charged into the mold cavity, but preferably will be at a somewhat elevated temperature, e.g. 125° F. No substantial curing of the binder should occur before this molding pressure is applied.

The piston 10 is separately heated to a temperature in the range of about 400–800° F. and preferably about 600° F. Heating of the piston 10 may be effected by any suitable heating means, but the heating should be conducted so as to have a substantially uniform piston temperature throughout the piston mass, except that the bottom end of the piston, i.e., the end 18, may be at a somewhat higher temperature than the remaining portions of the piston. Preferably the piston is heated by placing top and bottom thereof between the jaws of a press platen and passing an electrical current through the piston. If the bottom platen affords a relatively high resistance, for example, by using a steel contact surface, the bottom end of the piston will achieve the higher temperature referred to. The use of pressure insures a good electrical contact and avoids damage to the piston by arcing.

The heated piston is immediately inserted into the mold cavity and into contact with the mix therein. If there is any substantial delay in insertion of the heated plunger, it may be necessary to heat the piston to a higher temperature than indicated above so that the piston temperature will be in the range of 400–800° F. when the piston contacts the mix. The piston temperature selected should be sufficient to produce a partial cure of the thermosetting plastic binder at the molding pressure used. The cup surfaces actually in contact with the piston will be nearly completely curved, but the remainder of the cup and especially the base portion 38 will be only fractionally cured.

Immediately after the piston contacts the mix, an axial force should be applied to the piston so that the piston will subject to mix to a molding pressure. Any substantial delay in pressure application permits the piston heat flowing into the uncompressed mix to start curing the thermosetting plastic in the mix. If any substantial curing takes place with the mix uncompressed a bonded cup may not be formed or the cup will be poorly formed and will tend to have weak spots where poor bonding has occurred. It has been found that the molding pressure should be applied to the mix within 10 seconds of contact of the heated piston and the mix and preferably the molding pressure will be applied in less than two seconds.

The axial force may be applied to the piston in any suitable manner, but preferably this force is applied by compressing the mold and piston between the platens of a hydraulic press. The mold base may rest on the lower press platen and the upper press platen may be lowered into contact with the top of piston 10. It is desirable to insert the piston in the mold cavity but to hold the piston out of contact with the mix until the press platen contacts the piston in applying molding pressure. In this way there is a very short time interval between contact of the heated piston and the mix and subjection of the mix to full molding pressure. This time interval should be as short as possible but is limited by the time required for air to escape from the mold.

The molding pressure used will depend largely on the fluidity of the mix, the cup wall thickness and the cup height. The molding presssure, across the base 38 of the cup, should lie in the range of about 10,000 to 50,000 p.s.i. For a standard size D cup, a pressure of about 30,000 p.s.i. has been found preferable. The actual temperature achieved by the mix by heat transfer from the piston is not certain, but is believed to be in the range of about 300–400° F.

The high molding pressure should be maintained for sufficient time to ensure that the mix, which is not wholly fluid, fills completely the space between the piston and mold and to effect a partial cure of the thermosetting plastic, including a substantially complete curing of the surface region of the cup in contact with the piston. This partial cure may—but need not—be sufficient to yield a cup which would be self-supporting. Since hydraulic press time is expensive, it is desirable to maintain the full molding pressure only as long as needed.

In general a sufficient partial cure at full molding pressure will have been obtained in a time of about 10 seconds, measured from the moment of full pressure application, except that a somewhat greater time may be required in cups for very large cells, e.g., of the size 6. The axial force may then be reduced so that the molding pressure is reduced to 10–20% of its full value. With the pressure so reduced the arms 35 may be rotated to the position shown in FIG. 1 so that the round portions 36 engage slot 15 and act to clamp piston 10 in mold 11. With the piston so clamped in position, the reduced pressure on the mix will be maintained without external force exerted on piston 10. Hence the mold and piston may be removed from the press and a new mold may be inserted for making a succeeding cup.

The mold and piston in clamped condition, i.e., with the reduced molding pressure, will be hot when removed from the press and should remain hot for a sufficient time to achieve a substantially complete cure of the thermosetting plastic binder. This substantially complete cure is one which represents sufficient hardening to afford a strong, self-supporting cup. The curing time under reduced pressure is preferably several minutes and may be as much as 20 minutes, although in some cases only a very short time is needed.

It has been found desirable in order to effect a complete cure of all parts of the cup, especially the base portioin 38, to maintain the mold in heated condition before substantial cooling occurs. Thus the assembled piston and mold may be placed on a hot surface with the base 28 down for a period of time sufficient at least nearly to complete the curing. A suitable temperature for the hot surface, in the case of a "Fat D" size cell, is about 700–1000° F. and the assembled piston and mold may remain on this surface for about 5 minutes. The outer surface temperature of the mold wall 26 adjacent to the base 28 at the beginning of this 5 minute period will typically be about 150° F. while the temperature at the end of the 5 minute period will typically be about 300° F. It will be convenient for the hot surface to be a conveyor moving the assembled mold and piston to another processing area.

After the assembled mold and piston are removed from the heated surface they may be sujected to an air cooling, preferably with a fan driven air blast. This air cooling period, in the case of a "Fat D" size cell may be about 15 minutes and desirably will be on an conveyor belt. The temperature of the outer surface of mold wall 26 adjacent the base 28 at the end of the air cooling period of 15 minutes typically may be about 150° F., with an ambient air temperature of 88° F.

The mold and piston may be subjected to a relatively rapid cooling step either with or without the additional heating step on the heated surface referred to. It is preferable, however, to use this additional heating step. In general it will be desirable to cool the mold and piston to a temperature slightly above ordinary room temperature, e.g., 150° F. Cooling may conveniently be effected by immersing the clamped mold and piston in water or by subjecting them to a water spray.

A particularly efficient arrangement for effecting air curing and then cooling of the clamped mold and piston is illustrated diagrammatically in FIG. 5. In FIG. 5, reference numeral 41 represents an enclosed tunnel through which a conveyor belt 42 passes from left to right. The belt 42 may be divided into two sections with the left section heated to provide the additional heating referred to. Instead of a belt, the left section of the conveyor may be a hot plate with moving flight bars to carry the assembled mold and piston along. Clamped pistons and molds placed on the belt 42 immediately after removal from the press are advanced slowly toward the right. The tunnel length and belt speed may be adjusted as desired, but a transit-time of 15 to 20 minutes has been found satisfactory.

In general, it has been found preferable to air cool the clamped molds and pistons after the additional heating on the hot surface. However, water cooling can be used as described below.

Adjacent the exit end of the tunnel 41 there are provided a group of water spray nozzles 43 which are provided with water from a manifold 44. A fan 45 located adjacent the exit end of the tunnel directs a blast of air toward the entrance end of the tunnel. The water spray acts to cool the clamped pistons and molds and the air stream from fan 45 acts to carry cooling water spray toward the entrance end of the tunnel. This tunnel can be used for air cooling by shutting off the water spray and adjusting the conveyor speed.

When using the water spray, the arrangement is such that the clamped pistons and molds entering the tunnel receive little cooling and hence an elevated temperature is maintained for a substantial time. At about the half-way point in the tunnel, e.g., at about seven minutes if the total transit-time be 15 minutes, the cooling spray reaching the clamped pistons and molds starts to become really effective for cooling purposes. Cooling progresses rapidly as the clamped pistons and molds advance further toward the tunnel exit and cooling is complete when the clamped pistons and molds leave the tunnel.

When the cooling is complete the clamps are released and the piston 10 is withdrawn from the mold 11. The cup C remains on the piston and is then ejected by forcing pin 21 downwardly in space 19 forcing central rod 48 to move down and hence forcing the entire cup off the piston.

It has been found that the method of the invention yields a green carbon article of complicated shape which can be baked, i.e., carbonized, rapidly without substantial distortion. Thus the green carbon cups produced by the process may be placed in an oven and may be heated rapidly to a baking temperature, e.g., 2000° F. The entire baking interval may be quite short, e.g., 4 to 5 hours or less. The conductivity of the baked cups was about double that of the green cups and the baked cups exhibited the increased porosity characteristic of baked carbons. The cups should be protected against burning during baking, as by covering them with graphite powder or inert atmosphere. The baked carbon cups could be graphitized in the usual way if desired.

While the invention has been described in connection with specific embodiments thereof and in specific uses, various modifications thereof will occur to those skilled in the art without departing from the spirit and scope of the invention as set forth in the appended claims.

What is claimed is:

1. The method of molding a thin walled, self-supporting, electrically conductive green carbon cup, comprising the steps of:
   (a) forming a powdered mixture consisting essentially of from 20% to 40%, by weight, of a thermosetting resin as a binder and the balance an electrically conductive carbonaceous material;
   (b) charging a quantity of said mixture into a hollow mold closed at one end and open at the other end, said mold having an internal configuration and dimensions corresponding to the external configuration and dimensions of said cup;

(c) heating a piston at least to a selected temperature at least sufficient for the heat in said piston to cure the binder in said mixture when placed in contact with said mixture, said piston having an external configuration and dimensions corresponding to the internal configuration of said cup;

(d) inserting said heated piston into said mold and into contact with said mixture therein while said piston is at a temperature equal to said selected temperature;

(e) then immediately applying an axial external force to said piston to cause the latter to apply a predetermined molding pressure to said mixture and to cause the same to fill the space between said mold and piston;

(f) maintaining said piston in contact with said mixture and said mixture under said predetermined molding pressure for a sufficient time interval to effect a partial cure of said binder content of said mixture;

(g) then maintaining said piston in contact with said mixture and said mixture under a small fraction of said predetermined pressure for an additional time interval sufficient to effect an additional and substantially complete cure of said binder content of said mixture;

(h) then cooling said piston and mold and said molded cup therebetween; and (i) separating said piston and mold and removing said cooled cup therefrom.

2. The method set forth in claim 1 comprising the additional step of supplying external heating to said mold during said additional time interval.

3. The method set forth in claim 1 in which said selected temperature is in the range of 400 to 800° F.

4. The method set forth in claim 1 in which said predetermined pressure lies in the range of about 10,000 p.s.i. to 50,000 p.s.i.

5. The method set forth in claim 1 in which said fraction of said predetermined pressure is in the range of about 10% to 20% of said predetermined pressure, and in which said mixture is maintained under said fraction of said predetermined pressure for a substantial time interval.

6. The method set forth in claim 5 in which said additional time interval during said mixture is maintained under said fraction of said predetermined pressure and prior to said coolng is less than about 20 minutes and in which external heat is supplied to said mold during about the first five minutes of said additional time interval.

7. The method set forth in claim 1 in which said time interval during which said mixture is maintained under said predetermined molding pressure is approximately 10 seconds.

8. The method set forth in claim 1 which said axial external force is applied to said piston within about 10 seconds of contact of said piston and said mixture.

9. The method set forth in claim 1 in which said axial external force is applied to said piston within less than about 2 seconds of contact of said piston and said mixture.

10. The method set forth in claim 1 in which said cooling is effected by contacting said mold and piston with a blast of air.

11. The method set forth in claim 1 in which said cooling is effected by subjecting said mold and piston to a spray of liquid coolant.

12. The method set forth in claim 1 in which said additional curing step and said cooling step are effected by advancing said mold and piston along a path through which the same are first substantially surrounded by ambient air and then are contacted by a coolant spray the density of which increases during said advance along said path.

13. The method of molding a thin walled, self-supporting, electrically conductive green carbon battery cup, comprising the steps of:

(a) forming a powdered mixture consisting essentially of from 20% to 40%, by weight, of a phenol formaldehyde resin as a binder and the balance an electrically conductive carbonaceous material selected from the group consisting of natural graphite, electric furnace graphite and calcined petroleum coke;

(b) charging a quantity of said mixture into a hollow mold closed at one end and open at the other end, said mold having an internal configuration and dimensions corresponding to the external configuration and dimensions of said cup;

(c) heating a piston at least to a selected temperature lying in the range of about 400 to 800° F. and at least sufficient for the heat in said piston to cure the binder in said mixture when placed in contact with said mixture, said piston having an external configuration and dimensions corresponding to the internal configuration of said cup;

(d) inserting said heated piston into said mold and into contact with said mixture therein while said piston is at a temperature equal to said selected temperature;

(e) then immediately applying an axial external force to said piston to cause the latter to apply a predetermined molding pressure to said mixture and to cause the same to fill the space between said mold and piston;

(f) maintaining said piston in contact with said mixture and said mixture under said predetermined molding pressure for a sufficient time interval to effect a partial cure of said binder content of said mixture, said time interval being of the order of 10 seconds and said predetermined pressure lying in the range of about 10,000 p.s.i. to 60,000 p.s.i.;

(g) then maintaining said piston in contact with said mixture and said mixture under a reduced pressure of about 10% to 20% of said predetermined pressure for an additional time interval sufficient to effect an additional cure of said binder content of said mixture;

(h) supplying external heat to said mold during a first portion of said additional time interval;

(i) cooling said piston and mold and said molded cup therebetween during a second portion of said additional time interval; and (j) separating said piston and mold and removing said cooled cup therefrom.

14. The method set forth in claim 13 in which said axial external force is applied to said piston within less than about 2 seconds of contact of said piston and said mixture.

15. The method set forth in claim 13 in which said additional curing and said cooling are effected by advancing said mold and piston along a path through which the same are first heated and then substantially surrounded by a blast of ambient air.

16. The method set forth in claim 15 in which the total time required for said additional curing and said cooling is of the order of 20 minutes, approximately one-quarter of which is devoted to each of said steps.

17. The method set forth in claim 13 in which a lower end of said piston which first contacts the mixture in said mold is heated to a higher temperature than the remainder of said piston.

18. The method of molding a hollow green carbon article comprising the steps of:

(a) forming a powdered mixture consisting essentially of from 20% to 40%, by weight, of a thermosetting resin as a binder and the balance an electrically conductive carbonaceous material;

(b) charging a quantity of said mixture into a hollow mold closed at one end and open at the other end, said mold having an internal configuration and dimenesions corresponding to the external configuration and dimensions of said article;

(c) heating a piston at least to a selected temperature at least sufficient for the heat in said piston to cure the binder in said mixture when placed in contact with said mixture, said piston having an external configuration and dimensions corresponding to the internal configuration of said article;

(d) inserting said heated piston into said mold while said piston is at a temperature equal to said selected temperature but retaining said piston out of contact with said mixture;

(e) then immediately applying an axial external force to said piston to cause the latter to contact said mixture and to apply a predetermined molding pressure to said mixture and to cause the same to fill the space between said mold and piston;

(f) maintaining said piston in contact with said mixture and said mixture under said predetermined molding pressure for a sufficient time interval to effect a partial cure of said binder content of said mixture, said partial cure being substantially complete for portions of said mixture in substantial contact with said piston;

(g) then maintaining said piston in contact with said mixture and said mixture under a small fraction of said predetermined pressure for an additional time interval sufficient to effect an additional and substantially complete cure of said binder content of said mixture;

(h) then cooling said piston and mold and said molded article therebetween; and (i) separating said piston and mold and removing said cooled article therefrom.

References Cited

UNITED STATES PATENTS

| | | | |
|---|---|---|---|
| 2,903,499 | 9/1959 | Balaguer | 136—107 |
| 3,001,237 | 9/1961 | Balaguer | 264—29 |
| 3,060,516 | 10/1962 | Van Houten | 264—39 |
| 3,092,437 | 6/1963 | Carter et al. | 264—29 |
| 3,112,208 | 11/1963 | Johnson | 136—121 |
| 3,212,937 | 10/1965 | Talvenheimo | 136—122 |

WINSTON A. DOUGLAS, *Primary Examiner.*

A. SKAPARS, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,405,012                      October 8, 1968

Rodolfo Rodriguez Balaguer

It is certified that error appears in the above identified patent and that said Letters Patent are hereby corrected as shown below:

Column 1, line 20, "tht" should read -- that --. Column 3, line 48, "them old" should read -- the mold --. Column 4, line 41, "curved" should read -- cured --. Column 5, line 24, "round" should read -- rounded --; line 58, "sujected" should read -- subjected --; line 61, "an" should read -- a --. Column 7, line 46, after "during" insert -- which --; line 48, "coolng" should read -- cooling --; line 56, after "claim 1" insert -- in --. Column 8, line 15, "beating" should read -- heating --. Column 9, lines 1 and 2, "dimenesions" should read -- dimensions --.

Signed and sealed this 10th day of February 1970.

(SEAL)
Attest:

Edward M. Fletcher, Jr.                  WILLIAM E. SCHUYLER, JR.
Attesting Officer                         Commissioner of Patents